US009015306B2

(12) United States Patent  
Dupre et al.

(10) Patent No.: US 9,015,306 B2  
(45) Date of Patent: Apr. 21, 2015

(54) MAPPING PROTOCOL ENDPOINTS TO NETWORKED DEVICES AND APPLICATIONS BASED ON CAPABILITIES

(71) Applicant: Cisco Technology, Inc., San Jose, CA (US)

(72) Inventors: Anthony Dupre, Portland, OR (US); Michael Elford, Portland, OR (US); Landon Kuhn, Portland, OR (US); Steve Gorretta, Portland, OR (US)

(73) Assignee: Cisco Technology, Inc., San Jose, CA (US)

( * ) Notice: Subject to any disclaimer, the term of this patent is extended or adjusted under 35 U.S.C. 154(b) by 239 days.

(21) Appl. No.: 13/712,712

(22) Filed: Dec. 12, 2012

(65) Prior Publication Data

US 2013/0191524 A1 Jul. 25, 2013

Related U.S. Application Data

(60) Provisional application No. 61/576,201, filed on Dec. 15, 2011.

(51) Int. Cl.  
  *G06F 15/173* (2006.01)  
  *H04L 12/24* (2006.01)
(52) U.S. Cl.  
  CPC ........... *H04L 41/04* (2013.01); *H04L 41/0213* (2013.01); *H04L 41/022* (2013.01); *H04L 41/0886* (2013.01)
(58) Field of Classification Search  
  None  
  See application file for complete search history.

(56) References Cited

U.S. PATENT DOCUMENTS

| 5,537,417 | A | * | 7/1996 | Sharma et al. | 709/228 |
| 5,838,919 | A | * | 11/1998 | Schwaller et al. | 709/224 |
| 5,881,237 | A | * | 3/1999 | Schwaller et al. | 709/224 |
| 5,937,165 | A | * | 8/1999 | Schwaller et al. | 709/224 |
| 7,433,943 | B1 | * | 10/2008 | Ford | 709/223 |
| 7,631,109 | B2 | | 12/2009 | Roellgen | |
| 7,822,835 | B2 | | 10/2010 | Atkinson et al. | |
| 8,060,633 | B2 | * | 11/2011 | Zhang et al. | 709/230 |
| 2003/0135596 | A1 | | 7/2003 | Moyer et al. | |
| 2004/0249907 | A1 | | 12/2004 | Brubacher et al. | |
| 2006/0173979 | A1 | | 8/2006 | Roellgen | |
| 2010/0115581 | A1 | | 5/2010 | Goldsclag et al. | |
| 2010/0232305 | A1 | | 9/2010 | Shichino | |
| 2013/0205016 | A1 | | 8/2013 | Dupre et al. | |

* cited by examiner

*Primary Examiner* — Brian P Whipple  
(74) *Attorney, Agent, or Firm* — Hickman Palermo Becker Bingham LLP

(57) ABSTRACT

In an embodiment, a non-transitory computer readable storage medium storing instructions which cause processors to perform: collecting, at a management computer located separately with respect to a networked plurality of devices, device information about each of the devices; for each particular device: determining matches between the device capabilities for the particular device, and features of software applications; for a particular match: determining a particular software application that is configured to control the particular device; based at least in part on the device information for the particular device, determining a particular protocol endpoint from protocol endpoints that is configured to communicate control instructions from the particular software application to the particular device; creating data comprising a mapping between the particular software application, the particular protocol endpoint and the particular computing device; configuring an application computer program to use the mapping and a user interface computer program to manage the particular device.

20 Claims, 5 Drawing Sheets

MAPPING PROTOCOL ENDPOINTS TO NETWORKED DEVICES AND APPLICATIONS BASED ON CAPABILITIES

BENEFIT CLAIM

Cross-Reference to Related Applications

This application claims the benefit of U.S. Provisional Application No. 61/576,201, filed Dec. 15, 2011, titled "Extensible Server For Network Management," the entire contents of which is hereby incorporated by reference for all purposes as if fully set forth herein, under 35 U.S.C. §119(e).

This application is related to U.S. patent application Ser. No. 13/712,617, filed Dec. 12, 2012, titled "Remote Monitoring And Controlling Of Network Utilization," the entire contents of which is hereby incorporated by reference as if fully set forth herein.

FIELD OF THE DISCLOSURE

The present disclosure relates generally to methods for remote management of a computer network.

BACKGROUND

One of the problems in managing networks is the inability to manage a variety of third-party devices installed in local area networks. With the growing complexity of the computer networks, difficulties in establishing communications with a variety of heterogeneous devices and managing the heterogeneous devices becomes increasingly challenging.

Inability to manage third party devices in a local area network is particularly acute when the third party devices are heterogeneous. The problem is usually two-fold. On one hand, it may be difficult to communicate with the third-party devices in the local area network because the devices may implement a variety of communications protocols and interfaces, and it may be virtually impossible to communicate management instructions in compliance with such a variety of protocols and interfaces.

Developing a management application configured to facilitate communications with a vast quantity of third-party devices, which implement different protocols and interfaces, may be not only difficult, but also impractical. In fact, even if such an application was developed to meet today's needs, it would have to be modified each time a new device, incompatible with other devices, is added to the network. Hence trying to develop a management application that would enable communications with heterogeneous devices in local area networks may be an overwhelming task.

On the other hand, it may be difficult to encapsulate control communications intended to third-party devices in a way that is transparent to the owners of the local area networks. In a typical local area network, such as a residential network, a user may be responsible for managing its own network. However, because the user may be unfamiliar with the intricacies of the network management, he may seek some assistance from a service provider operator. Unfortunately, due to the fact that the service provider operator cannot access the user's devices directly, the service provider operator may be unable to debug the user's devices without the user's help. Hence, managing the local area networks in such a way that is both efficient and transparent to the users faces many obstacles and challenges.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

The appended claims may serve as a summary of the invention.

DESCRIPTION OF EXAMPLE EMBODIMENTS

Figure 1:
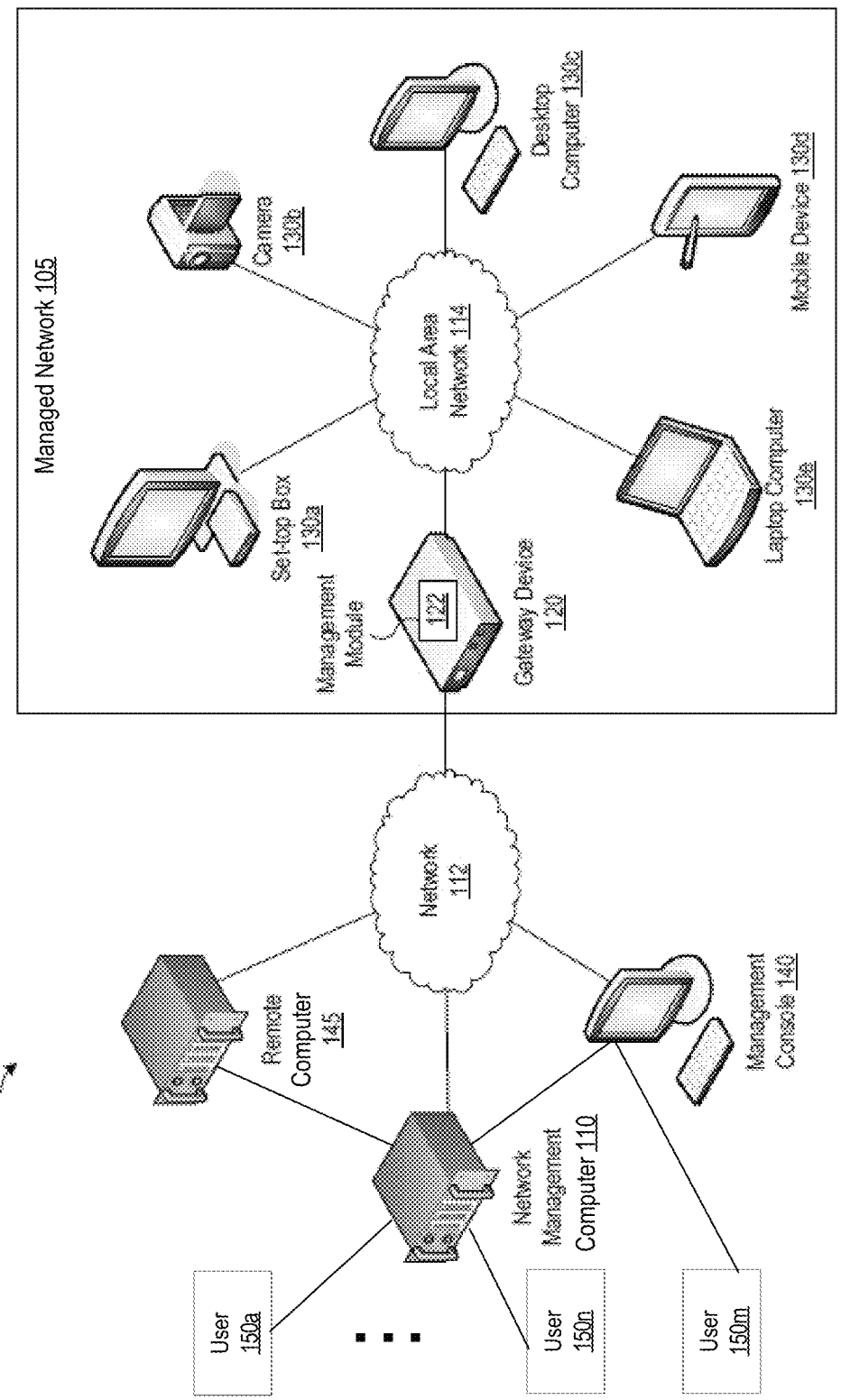
FIG. 1 illustrates an example network management environment for remote management of a managed network.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

Embodiments described herein provide methods for remote monitoring and management of a managed network. The methods implement a separation between software applications, which generate control instructions for controlling devices in the managed network, and protocol endpoints, which communicate the generated control instructions to the devices.

In an embodiment, at least a description of the capabilities of managed devices in the managed network is used to determine one or more network software applications that have the capabilities to generate control instructions for the managed devices. Further, at least the description of the capabilities of the managed devices is used to determine one or more network software applications that have the capabilities to communicate the control instructions to the managed devices using a communications protocol that the managed devices implement. For a particular device in the managed network, the information about the determined software applications, the information about the determined protocol endpoints and an identification of the particular device is stored in an association mapping. The association mapping is used by a management computer to determine a particular software application that is configured to generate control instructions for the particular device, and to determine a particular protocol endpoint that is configured to transmit the control instructions to the particular device.

In one embodiment, a method may be implemented in a Network Management Environment ("NME") comprising a network management computer, which may be referred to as an Auto-Configuration Server ("ACS"). The network management computer is also referred herein to as a management computer.

A management computer may be configured to interact with and manage remote devices located in one or more managed networks. For example, a management computer may be configured to interact with and manage a plurality of different local area networks, located in separate residential premises and comprising various heterogeneous computer devices. Further, a management computer may be configured to communicate with devices located in network other than managed networks, facilitate connectivity with service providers, and facilitate communications between the networks.

In an embodiment, a management computer receives device-specific information from devices in a managed network or from a gateway in the managed network. Device-specific information may comprise various data, including device capabilities of the computing devices. For example, the device-specific information of a particular device may include information about the identity of the particular device, the device type or class information, the manufacturer information, the device functionality information, the device configuration, the communications protocols implemented on the particular devices, the identifiers of the ports implemented on the particular device, and the like.

In an embodiment, a management computer matches the capabilities of devices in a managed network with the capabilities of network software applications implemented in a management computer. For example, for each device, for which device-specific information was received, the management computer may determine one or more matches between the device capabilities of the device and the capabilities of network software applications implemented in the management computer. The capabilities of network software applications may be determined ahead of time and stored in a capabilities mapping, described in the next sections.

The purpose of determining the matches for a particular device is to find one or more software applications that have the capabilities to control the particular device. In particular, the purpose of determining the matches for the particular device is to find one or more software applications that have the capabilities to generate control instructions, which when executed on the particular device, would regulate network utilization by the particular device.

A network software application is an application that is configured to manage certain functionalities of a device. For example, a content filtering application may be configured to manage a smart phone device that has the capabilities to download content from a content provider network. In this example, a description of the content downloading capabilities of the smart phone device may be compared with a description of the capabilities of the content filtering software application to determine whether a match between the capabilities of the smart phone and the capabilities of the content filtering application exists. Since the content downloading capabilities of the smart phone match the content downloading and filtering capabilities of the content filtering application, the match may be found.

In an embodiment, based at least in part on device-specific information for a particular device, one or more protocol endpoints configured to communicate control instructions from a particular network software application to the particular device is determined.

A protocol endpoint application is an application that is configured to communicate control instructions to a particular device or a particular group of devices. For example, a particular protocol endpoint may be an application configured to establish a TCP connection between devices, communicate data segments using the TCP connection, and close the TCP connection between the devices. Hence, the TCP protocol endpoint may be configured to communicate the control instructions to a device that has the capabilities to establish a TCP connection, communicate data segments using the TCP connection and close the TCP connection. If the device-specific information for a particular device indicates that the particular device implements TCP, then by comparing the device-specific information for the particular device with a description of the capability of the TCP protocol endpoint, a management program may identify the TCP protocol endpoint as suitable for communicating the control instructions from the management computer to the particular device.

In an embodiment, an association mapping between a particular network software application, a particular protocol endpoint and a particular device, is created and stored. An association mapping (or just a mapping) for a particular network device reflects an association between a particular network software application, configured with the features for monitoring and managing the particular device, a particular protocol endpoint for communicating with the particular device, and the particular device. For example, if a particular computing device is a wireless device, and the particular wireless device has the capabilities to download and play video games, then a network management computer may create and store an association mapping between a particular game-distribution application, a particular protocol endpoint configured to deliver games to the particular wireless device, and for example, an identifier of the particular wireless device. The particular game-distribution application may be configured to receive requests and to download the games. The particular protocol endpoint may be configured to send requests from the wireless device to the particular game-distribution application, and send game contents from the particular game-distribution application (or a website or other sources) to the wireless device. The association mapping may be stored in a data center, cloud data storage or any other storage facility. The association mapping may be retrieved each time a user of the wireless device requests downloading a video game, and each time the network management computer downloads a video game to the wireless device.

In an embodiment, a management computer configures a management application to manage devices in a managed network. Configuring the management applications comprises configuring the management application to access the association mapping described above, and configuring the management application to interact with a user interface computer program. The user interface computer program may implement user selectable controls which, when selected, may cause a particular software application generate the control instructions.

In an embodiment, a management computer receives, from a user interface program, second data, which defines particular user-selected controls for a particular computing device. Upon receiving second data, a management application may retrieve an association mapping for the particular device, and use the association mapping to identify a particular software application, configured to generate, based on the received second data, control instructions for the particular device. The management application may also use the association mapping to identify a particular protocol endpoint application, configured to communicate the control instructions to the particular device. Using the particular network software application, the user-selected controls are translated into particular control instructions for the particular device. Using the particular protocol endpoint the particular control instructions are transmitted to the particular device.

In an embodiment, particular control instructions cause any one of: controlling a particular computing device, managing a wireless network, content filtering, provisioning the particular computing device, managing a network quality of service, performing a network analysis, firmware upgrading, heartbeat monitoring, network access redirecting, configuration backup and restore, collecting device visibility, collecting population information of a network comprising the particular computing device.

In an embodiment, protocol endpoints provide support for any one of: SNMP, TR68, TR98, TR140, TR126, TR143, TR106, TR111, TR135, TR104, and TR196.

In an embodiment, a network management computer is configured to manage a plurality of different local area networks, each located on a different customer premise and comprising heterogeneous computing devices.

In an embodiment, a network management computer is a customer representative computer that is configured to automatically configure one or more different local area networks.

In an embodiment, the method further comprises configuring a workflow computer program to manage synchronous or asynchronous state transitions between multiple components of the network management computer, and waiting for a particular computing device to respond to an HTTP request.

In an embodiment, the method is performed by one or more computing devices.

Example Embodiments of a Management Computer and a Managed Network

A management computer may be configured to interact with and manage remote devices located in managed networks. For example, a management computer may be configured to interact with and manage a plurality of different local area networks, located in separate residential premises and comprising various heterogeneous computer devices.

A management computer may also be configured to execute a workflow computer program supporting communications with devices installed in managed networks. A workflow computer program may be configured to manage synchronous or asynchronous state transitions between multiple components of the management computer. The workflow computer program may also be configured to handle communications with third-party devices in the managed networks, and manage HTTP request-response communications with the devices.

A managed network may be any type of a network that is remotely managed by a management computer. Examples of managed networks include local area networks, residential networks, home networks, customer networks, consumer networks, Wi-Fi networks, or any other local area networks that are separate from the management computer. For purposes of illustrating clear examples, in an embodiment, the managed networks may be called customer networks because, from the perspective of a service provider, the managed networks are owned or operated by customers of the service provider. However, the term customer is merely used herein as a convenient label. In an embodiment, a managed network may be any type of a local area network used by users, consumers, clients, customers or other entities.

In an embodiment, communications between a management computer and devices in a managed network are facilitated by a network gateway device. A network gateway device may be configured in the managed network, and may be communicatively coupled to the management computer either directly or indirectly. Examples of a network gateway device may include cable modems and routers, DSL modems and routers, or the like.

A network gateway device located in a managed network may provide to a management computer various types of information about devices in the managed network. For example, the gateway may provide device—specific information about the identities of devices present in the network, configuration information of the devices, topographical and connectivity information of the network, network utilization by the devices, and other network performance information.

Device-specific information may pertain to identities of the devices in a managed network and capabilities of the devices. For example, the device-specific information for a particular device may include information about the identity of the particular device, the device type or class information, the device manufacturer information, the device functionality information, the device configuration, the communications protocols implemented on the devices, the identifiers of the ports implemented on the particular device, and the like.

A network gateway device may also be configured to receive instructions from a management computer. A gateway may receive the instructions from a user who directly accesses the gateway in the managed network, or from an operator who accesses a management computer. The instructions may be intended to accomplish a variety of tasks, such as controlling, provisioning and configuring the devices in the managed network. For example, the instructions may pertain to restricting network utilization by one or more devices in the managed network, regulating network utilization by the devices in the managed network during a particular time interval, restricting a certain type of traffic directed to or from the devices in the managed network, or any other network-controlling tasks.

A network gateway device may also be configured to generate and display a graphical user interface (GUI). Using the GUI, the gateway may provide interactive access to devices in the managed network. For example, in the GUI, the gateway may display network utilization information for a user. The network utilization information may comprise statistical data, charts, graphs, warning, error messages, bandwidth utilization data aggregated for each device and for groups of devices, a restriction schedule and other controlling information. Via the GUI, the gateway may also receive user instructions pertaining to the network utilization. Further, the network gateway device may display various statistical data, such as counts of bytes, packets and segments received or sent by each device in the managed network.

In an embodiment, using device-specific information, a management computer determines one or more software applications configured to generate control instructions for devices in a managed network. For example, for a particular computing device from a plurality of devices in the managed network, using the device-specific information, the management computer may determine a particular software application that is configured to monitor and control network utilization by the particular device.

To determine a particular software application, a management program executed by the management computer may determine a match between the device capabilities, included in the device-specific information of the particular device, and the capabilities of each of network software applications implemented in the management computer. In finding the match, the management program may use the device-specific information and a capabilities mapping. A capabilities mapping is usually generated by an operator of the management computer when one or more software applications are ported to the management computer. A capabilities mapping comprises descriptions of the capabilities of each network software application implemented in the management computer.

A capabilities mapping is not to be confused with an association mapping. A capabilities mapping, also referred to as a device driver, reflects capabilities and features of software applications implemented in the management computer. A capabilities mapping is usually created and stored by an operator of the management computer when the software applications are ported to the management computer. In contrast, an association mapping is created when a management computer already determines a particular software application that is configured to manage the particular device, and determines a particular protocol endpoint that is configured to transmit control instructions to the particular device. An association mapping reflects an association between a particular software application that is configured to generate control instructions for the particular device, a particular protocol endpoint that is configured to transmit control instructions to the particular device, and the particular device.

A capabilities mapping for a particular device is created to determine a software application that has the capabilities to generate control instructions for the particular device. In contrast, an association mapping is created after the capabilities mapping was used to determine a particular software application that has had the capabilities to generate control instructions for the particular device. A capabilities mapping is created to determine a software application that has the capabilities to generate control instructions for the particular device, while an association mapping is created to actually facilitate the generating of the control instructions for the particular device and transmitting of the control instructions to the particular device.

A capabilities mapping may be implemented as any data structure such as a data table, a data container, a spreadsheet, or the like. In an embodiment, the capabilities mapping is referred to as a device driver, which for purposes of the disclosure herein is distinct and different from other uses of the term device driver in other contexts, such as the operating system context, and the like. If a match between the capabilities is found, then the matching particular software application is deemed to be configured to control the particular device.

A network software application is an application that is configured to manage a device or a group of devices. For example, a bandwidth restricting application may be configured to manage a personal computer that has the capabilities to utilize bandwidth to communicate with other devices. In this example, the bandwidth restricting capabilities of the bandwidth restricting application may be compared with the bandwidth usage capabilities of the personal computer to determine whether a match between the capabilities may be found. Since the bandwidth usage capabilities of the personal computer match the bandwidth restricting capabilities of the bandwidth restricting application, the match is found.

In an embodiment, using device-specific information, a management computer also determines protocol endpoint applications for communicating control instructions to devices in a managed network. For example, for a particular computing device, using the device-specific information of the particular device, the management computer may determine a particular protocol endpoint application that is configured to facilitate communications between the management computer and the particular device.

A protocol endpoint application is an application that is configured to communicate control instructions to a device or a group of devices. For example, a particular protocol endpoint may be an application configured to establish a TCP connection between devices, communicate data segments using the TCP connection, and close the TCP connection between the devices. The TCP protocol endpoint may be configured to communicate the control instructions to a particular device if the particular device has the capabilities to establish a TCP connection, communicate data segments using the TCP connection and close the TCP connection. If the device-specific information for the particular device indicates that the particular device implements TCP, then by comparing the device-specific information for the particular device with the capabilities of the TCP protocol endpoint, the management program may identify the TCP protocol endpoint as the protocol endpoint application suitable for communicating the control instructions from the management computer to the particular device.

Example Embodiments of Network Management Environment

FIG. 1 illustrates an example network management environment 100 for remote management of a managed network 105. NME 100 comprises a network management computer 110, communicatively coupled via network 112 with one or more managed networks 105, comprising one or more local area network 114 and one or more devices 130. Network management computer 110 is communicatively coupled with one or more remote computers 145, one or more users 150 and one or more networks 112.

A management computer 110 may be part of any type of network such as a service provider network, a data content delivery network, or other network providing services to users, consumers or customers. For example, a management computer may be part of an ISP network, part of a CDN or just provide services to some service provider network. A management computer is configured separately from the managed networks 105.

A managed network 105 is a network remotely managed by a management computer 110. Examples of managed networks include local area networks, residential networks, home networks, customer networks, consumer networks or any other local area networks that are separate from the management computer. In an embodiment, the managed network 105 comprises one or more local area networks 114 and one or more devices 130.

Network management computer 110 may be communicatively coupled to one or more remote computers 145, configured to support network management computer 110. Remote computers 145 may comprise a cloud storage system, various database servers and other storage devices supporting network management computer 110. For example, a remote system 145, implementing a cloud storage system, may provide storage capacity to network management computer 110 for storing information about types and identities of devices 130 present in local area network 114, configurations of devices 130, topographical and connectivity information of local area network 114, and network utilization by devices 130.

In an embodiment, network management computer 110 remotely manages a managed network 105. Managing the managed network 105 may include controlling network 105 and devices 130, configuring and reconfiguring network 105 and devices 130, and monitoring the activities taking place in network 105 and devices 130. For example, network management computer 110 may control a particular device 130, manage wireless connectivity within network 114, filter contents provided to a particular device 130, provision a particular device 130, manage a quality of service in network 114, perform a network analysis, perform a firmware upgrade, perform a heartbeat monitoring, direct and redirect access to devices 130, perform a configuration backup and restore, collect a device visibility data, and collect population information for network 114 and devices 130.

A gateway device 120 may be any type of router, modem, or other device that is configured in managed network 105, and that communicatively couples local area network 114 with network 112. A gateway device 120 may be a cable or DSL modem, a router or a similar device that is installed in managed network 105 to facilitate connectivity for devices 130 and devices outside of managed network 105. For example, a gateway device 120 may be a residential gateway configured in a residential network, a customer gateway device configured in a customer network, a consumer gateway configured in a consumer network, or any other type of a gateway configured in managed network 105.

A local area network 114 may be any type of data communications network. Non-limiting examples of local area network 114 include residential networks, home networks, customer networks, corporate networks, entertainment networks, retail networks and other types of local area networks. Local area network 114 may be a wire-based network, a wireless network or a combination of both.

Devices 130 in managed network 105 may be communicatively coupled to local area network 114. Via local area network 114, devices 130 may communicate with gateway device 120, and via gateway device 120, devices 130 may communicate with other networks, such as network 112. Non-limiting examples of devices 130 include a set-top box 130a (such as a cable box, a satellite receiver, a gaming system), a camera 130b (such as a home video camera, a security camera, a Web camera), a desktop computer 130c, a mobile device 130d (such as a smart phone, a tablet computer, a PDA), and a laptop computer 130e.

Other devices may also be connected to local area network 114. Such devices may include home appliances (such as refrigerators, washing machines, and hot tubs), lighting systems, security systems, digital video recorders, entertainment systems, and the like.

Gateway device 120 and devices 130 may be managed locally or remotely. For example, gateway device 120 may be managed locally by a user who directly accesses gateway device 120 and issues management commands or instructions from gateway device 120 to gateway device 120 and devices 130. This type of managing the gateway and devices is referred to as "local" because the management commands and instructions are issued by an entity directly accessing gateway 120.

According to another example, gateway 120 and devices 130 may be managed remotely. In this example, gateway device 120 may receive instructions and requests from users 150a-m, who may access network management computer 110 and communicate with management network 105 via network management computer 110 and network 112.

Users 150a-m may be individuals who are provided with access to network management computer 110. For example, a user 150 may be a technician employed by a service provider network company, a system operator, a network manager or other individual allowed to access network management computer 110.

Users 150a-m may have either direct or indirect access to network management computer 110. For example, as depicted in FIG. 1, users 150a-n may access network management computer 110 directly, while user 150m may access network management computer 110 from a management console 140. According to other example (not depicted in FIG. 1), users 150a-m may access network management computer 110 via network 112.

In an embodiment, gateway device 120 comprises a management module 122, configured to facilitate management of local area network 114 and devices 130. In an embodiment, a management module 122 is configured facilitate bandwidth monitoring and regulation in managed network 105. For example, in response to instructions or commands received from network management computer 110, management module 122 of gateway device 120 may gather data that reflects network utilization by one or more of devices 130, aggregate the received data, transmit the aggregated data to management computer 110, and await instructions from management computer 110 pertaining to regulating network utilization by devices 130 in local area network 114.

A management module 122 may also be configured to facilitate management of network 114 and devices 130. Management module 122 may be configured to gather device visibility and population information about local area network 114 and devices 130. The gathered information may comprise device identity information, including address information, such as hardware and network addresses, and network names; device type information, such as a desktop computer type, a camera type, or others; and device manufacturer and brand information, and the like. Management module 122 may then transmit the gathered information to network management computer 110 for further processing and storing. The stored information may be accessed by a user 150, who may be a customer support representative or a technician. The user may access the stored information either directly at network management computer 110, or via management console 140. For example, a technician 150m may use management console 140 to determine the identities of the customer devices 130 connected to network 114.

Besides providing device visibility information, management module 122 may also perform other functions and tasks. For example, management module 122 may facilitate direct control of devices 130 by forwarding commands or other data to a management interface of devices 130. Management module 122 may also facilitate content filtering, device configuration backup and restore, network quality of service management, network analytics, wireless network management, firmware upgrades, heartbeat monitoring, network access redirection, and the like.

Functions of management module 122 in gateway device 120 may be made available remotely and locally. For example, functions of management module 122 may be made remotely available to users 150, who may access network management computer 110 to connect with gateway device 120. According to another example, functions of management module 122 may be made locally available to the users who may access gateway device 120 from managed network 105 directly.

To facilitate local access to functions of management module 122, gateway device 120 may provide a control panel or other type of interface that can be used by a local user to configure, control, and otherwise manage the operation of network 114. The local interface or control panel may be made available via a Web server or an application component executing on gateway device 120.

In an embodiment, NME 100 may be deployed to manage network services provided by a network provider, such as a cable company, a telephone company, or an Internet service provider. When NME 100 is deployed for a network provider, NME 100 may be accessed by customer support representatives of the network provider, help desk assistants, technicians or the like. They may access and use network management computer 110 to manage multiple distinct local area networks located at customer premises, such as local area network 114 located at managed network 105. Network management computer 110 may reside in a data center or other facility operated by or for the network provider.

In an embodiment, NME 100 is implemented using Prime Cloud solutions commercially available from Cisco Systems, Inc., San Jose, Calif.

Network Management Extensibility

In an embodiment, network management computer 110 comprises an extension framework that facilitates dynamic configuration, adaptability, and control of third-party customer devices. For example, network management computer 110 may support extensions, plug-ins, dynamic libraries, adapters, drivers, or similar modules, by which network management computer 110 may be configured to meet customer needs, market demands, emerging technologies, alternative protocols, or the like.

In an embodiment, network management computer 110 comprises an interface for one or more plug-ins. The plug-ins may be configured to perform or provide various classes of functionality and communicate according to a variety of different communications protocols. For example, network management computer 110 may comprise plug-ins configured to manage customer subscriptions. According to another example, network management computer 110 may comprise plug-ins configured to perform: an application synchronization; a key-word search, including a full-text search, a search results analysis and reporting; creating and displaying a user interface for administrators; creating and displaying a consumer portal for subscribers; manage workflows; provide Web Services, such as facilitating interactions between plug-ins and other modules; or the like.

In an embodiment, network management computer 110 cooperates with gateway device 120 to facilitate bandwidth monitoring and regulation of network 114. For example, in response to instructions or commands received from network management computer 110, management module 122 of gateway device 120 may gather data that reflects network utilization by one or more of devices 130, aggregate the received data, store the aggregated data, and use the aggregated data to determine instructions and commands to regulate network utilization by devices 130 in network 114.

Implementation Examples

Figure 2:
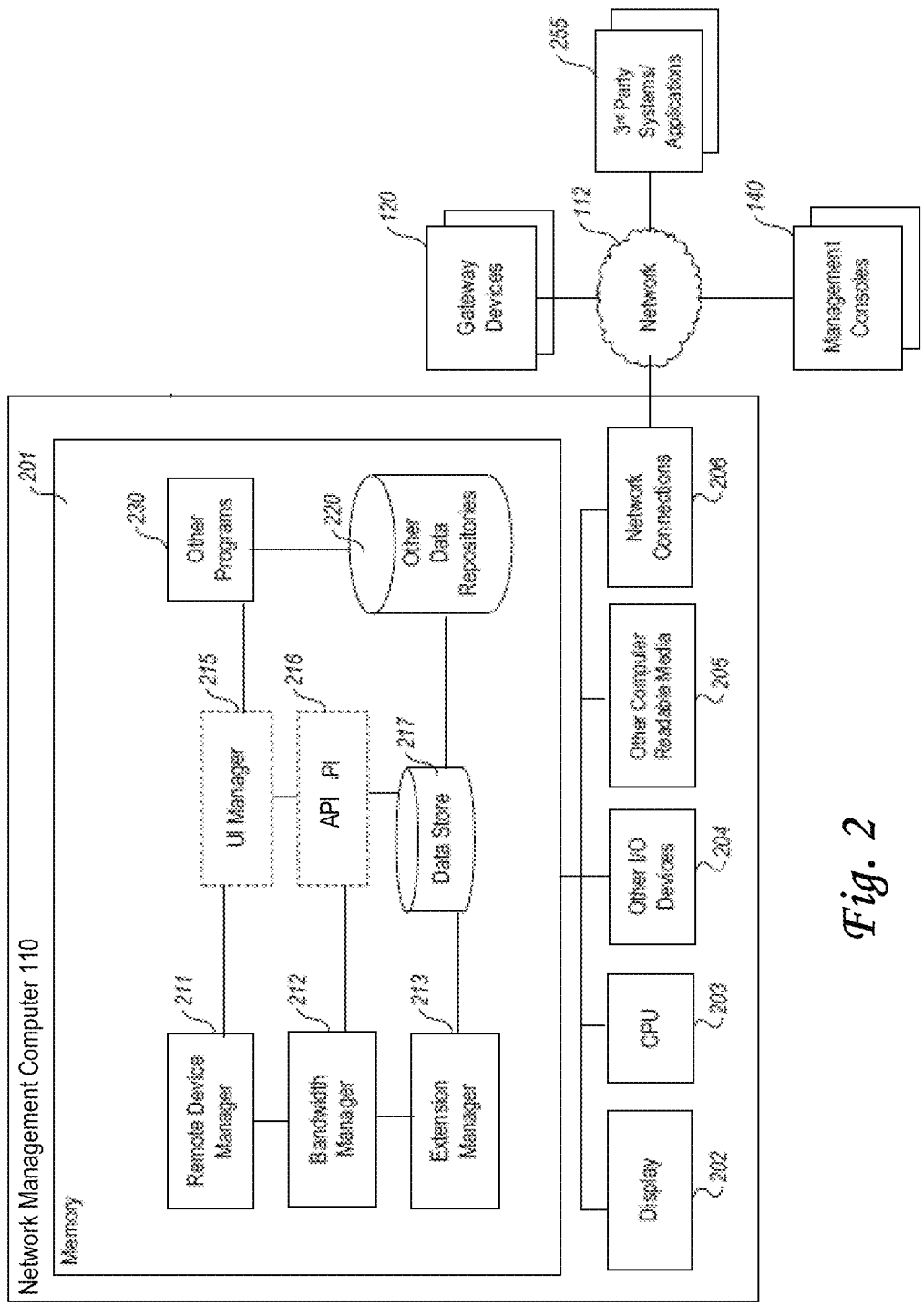
FIG. 2 illustrates an example network management computer for remote management of a managed network.

FIG. 2 illustrates an example network management computer 110 for remote management of a managed network. In an embodiment, a network management computer 110 may be implemented in software, hardware, firmware, or in some combination to achieve the capabilities described herein.

In an embodiment, network management computer 110 comprises a computer memory 201, a display 202, one or more Central Processing Units ("CPU") 203, other input/output devices 204 (such as a keyboard, mouse, CRT or LCD display, and the like), other computer-readable media 205, and network connections 206.

In an embodiment, components of network management computer 110 are implemented as an executable program, running on CPU 203, and accessing one or more static or dynamic libraries. According to another example, network management computer 110 may be implemented as code instructions, processed by a virtual machine that executes as one of other programs 230.

In an embodiment, code instructions of network management computer 110 may be transmitted over other computer-readable media 205, stored in memory 201, and executed on one or more CPUs 203. Other code or programs 230 (such as an administrative interface, a Web server, and the like) and potentially other data repositories, such as data repository 220, may also reside in memory 201, and execute on one or more CPUs 203.

Some of the components depicted in FIG. 2 may not be present in specific implementations. For example, some embodiments may not include other computer readable media 205 or a display 202.

Network management computer 110 may interact with network 112, one or more gateway devices 120, management consoles 140, and third-party systems and applications 255. Network 112, gateway devices 120, management consoles 140 and third-party systems and applications 255 are referred herein as a managed network 105.

Network 112 may be any combination of communications media (such as a twisted pair, coaxial, fiber optic, radio frequency), hardware (such as routers, switches, repeaters, transceivers), and protocols (such as TCP/IP, UDP, Ethernet, Wi-Fi, WiMAX). Network 112 may facilitate communications between remotely situated individuals (system operators, customer service technicians or users) and devices communicatively coupled to gateway device 120.

Third-party systems and applications 255 may include back-end customer management systems used by carriers or other network providers, legacy network control and configuration systems, and the like.

In an embodiment, network management computer 110 comprises a remote device manager 211, a bandwidth manager 212, an extension manager 213, a user interface manager 215, a network management computer application program interface ("API") 216, and a data store 217. In FIG. 2, the user interface manager 215 and the API 216 are drawn using dashed lines to indicate that, in some embodiments, functions performed by one or more of these components may be performed by devices located externally with respect to network management computer 110.

A remote device manager 211 may be configured to interact with gateway device 120. For example, remote device manager 211 may receive device visibility information from gateway device 120, and store the received information in a data store 217. Remote device manager 211 may also send commands to control the operation of gateway device 120. Information received and generated by remote device manager 212 may be stored in data store 217.

For example, a remote device manager 211 may be configured to receive, from a network gateway device in a managed network, device-specific information for each of a plurality of devices located in the managed network behind the gateway device. The device-specific information for a particular device may include information about the identity of the particular device, the device type or class information, the manufacturer information, the device functionality information, the device configuration, the communications protocols implemented on the particular devices, the identifiers of the ports implemented on the particular device, and the like.

Using device-specific information for a particular device, remote device manager 211 may determine a particular software application that is configured to monitor and manage the particular device. To determine a particular software application, remote device manager 211 may try to determine a match between a description of the device capabilities of the particular device and a description of the features of a particular network software application. If a match is found, then the matching particular software application is deemed to be configured to control the particular device. For example, a network management application, executed by an extension manager 213 may be configured to manage a personal computer that has the capabilities to download contents from a CDN, and if a particular device has the capabilities to download contents from the CDN, then a match between the capabilities of the network management application and the capabilities of the particular device may be found.

Using device-specific information for a particular device, remote device manager 211 may also determine a particular protocol endpoint that is configured to communicate control instructions to the particular device. To determine a particular protocol endpoint, remote device manager 211 may try to determine a match between a description of the device capabilities of the particular device and a description of the features of a particular protocol endpoint application. If a match is found, then the matching particular protocol endpoint application may be configured to communicate control instructions from the management computer to the particular device. For example, a TCP protocol endpoint application, executed by a network connections module 206, may be configured to communicate the control instructions from the management computer 110 to the particular device 255, such as a personal computer, if the particular device implements TCP. According to another example, a protocol endpoint application implementing IEEE 802.11, branded as Wi-Fi, executed by a network connection module 206, may be configured to communicate control instructions from the management computer 110 to the particular device 255, such as a smart phone, if the particular device implements IEEE 802.11.

A bandwidth manager 212 may be configured to monitor bandwidth parameters within network 112 and regulate network utilization within network 112. For example, bandwidth manager 212 may instruct gateway device 120 to initiate monitoring of the network utilization, collect and aggregate the network utilization data, generate statistics based on the aggregated data, and issue control instructions to regulate the network utilization.

An extension manager 213 may be configured to manage various extension applications, such as plug-ins, drivers and dynamic libraries, configured to extend the operation of network management computer 110. Extension manager 213 may manage the extension applications to provide flexibly in configuring network management computer 110 to adapt network management computer 110 to different deployment scenarios, customer needs, changing conditions, or the like. For example, upon connecting a new device to a gateway device 120, extension manager 213 may cooperate with a particular extension application, which is compatible with the new device, to enable network management computer 110 to communicate control instructions to the new device.

An UI manager 215 may be configured to generate and display a user interface, and to facilitate user interaction with network management computer 110 and its various components. For example, UI manager 215 may provide interactive access to network management computer 110, such that users and customer support representatives may interact with and manage devices connected to gateway device 120. In an embodiment, access to the functionality of UI manager 215 may be provided via a Web server, possibly executing as one of the other programs 230. In such embodiments, a user operating a Web browser executing on one of management consoles 140 may interact with network management computer 110 via UI manager 215.

An API 216 may be configured to provide programmable access to one or more functions of network management computer 110. For example, API 216 may provide a computer-generated user interface to enable access to one or more functions of network management computer 110. The API 216 may also provide support to other programs 230 or some other units. Furthermore, API 216 may facilitate the development of third-party software applications, such as user interfaces, plug-ins, news feeds, adapters for integrating functions of network management computer 110 into Web applications, and the like.

In an embodiment, API 216 may be invoked or otherwise accessed via remote entities. Accessing various functions of network management computer 110 may be enabled by accessing a management console 140 or via one of the third-party systems/applications 255. For example, using a customer relationship management system (as one of the third-party systems 255), a user may send customer information, such as customer names, addresses, and account information, to network management computer 110 via API 216.

In an embodiment, API 216 may be configured to provide management widgets, such as code modules, configured to allow third-party applications 255 to interact with network management computer 110. By allowing third-party application 255 to interact with network management computer 110, functionalities of network management computer 110 may be made available to a variety of other applications, such as mobile applications.

A data store 217 may be configured to store data and provide access to the stored data. Data store 217 may be used by various modules of network management computer 110 to store and/or communicate information. For example, components 211-216 of network management computer 110 may use data store 217 to record various types of information, such as network utilization information, device identity information, and the like.

In an embodiment, components 211-216 communicate with each other primarily through data store 217. In another embodiment, components 211-216 communicate with each other directly, bypassing data store 217, and using various communications mechanisms, such as messaging, function calls, pipeline communications, socket communications, shared memory access, and the like.

A data store 217 may be implemented as one or more database systems, file systems, or any other technique for storing such information, or any combination of the above, including implementations using distributed computing techniques.

Remote Management of a Local Area Network

Figure 3:
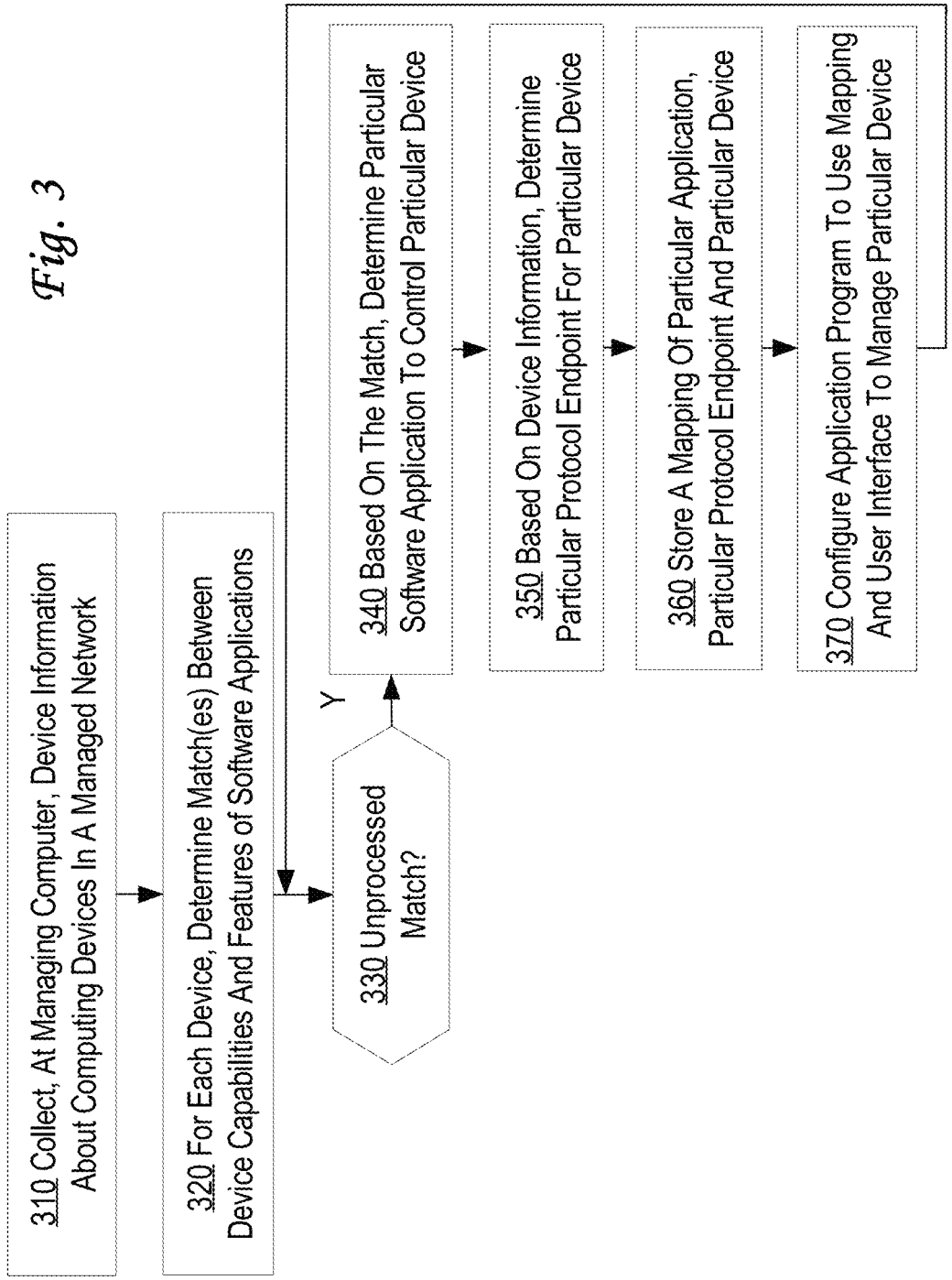
FIG. 3 illustrates an example method for remote management of a managed network.

FIG. 3 illustrates an example method for remote management of a managed network. In an embodiment, remote managing of a managed network comprises various aspects of monitoring, configuring and controlling devices located in the managed network. In an embodiment, the remote monitoring and controlling of devices in the managed network allows managing a variety of heterogeneous devices in a local area network by using network software applications configured to generate control instructions for the devices, and communicating the control instructions to the devices using communications protocols that the devices implement.

In an embodiment, a remote managing of a particular device may be performed by a management program that invokes a particular software application that is configured to generate control instructions for the particular devices. Further, the management program invokes a particular protocol endpoint that is configured to communicate the control instructions to the particular device using the communications protocol that the particular device understands. The particular software application need not be aware of the protocol types or the interface types implemented in the particular device in the managed network, and need not be configured to interact with the device directly. Instead, once the particular software application derives the control instructions for the particular device, the particular software application may rely on the particular protocol endpoint to communicate the control instructions to the particular device and to receive responses from the device. Hence, in managing the particular device, the management program cooperates with the particular software application and the particular protocol endpoint, and managing of the plurality of devices involves determining the particular software application and the particular protocol endpoint for each device from the plurality of devices.

In an embodiment, implementation of the remote monitoring and managing of a managed network does not involve modifications to a management program each time a new device is added to the managed network. Even if a new device is incompatible with other devices in the managed network, modifications of the management application may be avoided. For example, any communications compatibility issues may be resolved at a protocol endpoint's level by developing a particular protocol endpoint application to handle the communications with the new device, and integrating the particular protocol endpoint with the management application.

A network management application may be configured to perform a variety of tasks. For example, a network management application may be configured to perform content filtering of contents downloaded onto a particular device in a managed network. Upon receiving an indication that a user working at the particular device attempts to download some contents from a website which was previously indicated as inappropriate for the user, the network management application may generate control instructions, such as a refusal to access the particular website, and invoke a particular protocol endpoint application to communicate the instructions to the user working at the particular device.

According to another example, a network management application may be configured to perform parental control functions. Upon receiving an indication that a particular user (a child) working at a particular device requested access to a website that an authorized user (a father) previously marked as inappropriate for the child, the management application may generate a request to the father to reconsider the child's request, and invoke a particular protocol endpoint application to communicate the request to the father.

In step 310, a management program, executed by a management computer, collects device information about computing devices located in a managed network. A network management computer, such as network computer 110, may be located remotely with respect to the managed network, as depicted in FIG. 1. Alternatively, the network management computer may be part of the managed network, or may be implemented in a gateway.

In an embodiment, device information includes device capabilities, device identity information, configuration information, status information, connectivity information, status information, error messages, device bottleneck information, the device packets-sent and packets-received counts, the device bytes-sent and bytes-received counts, and other device-specific information.

Device information may be collected by a management program in cooperation with a gateway, such as gateway 120 depicted in FIG. 1. The management program may be configured to send a request to the gateway instructing the gateway to collect the device information and to transmit the device information to the management program. Alternatively, the device information may be collected by the management program after the device information is received from the individual computing devices, from the gateways, or both.

A gateway may request device information from a device upon receiving a request from a user accessing a network management computer, from a user accessing the gateway, or from a program executed by the management computer or the gateway. In response to sending the request, the gateway may receive the device information from the device.

A gateway may also receive the device information from a device without actually requesting the information. That may occur when the device is programmed to periodically provide its own status and configuration data to the gateway even if the gateway does not specifically request such information.

In step 320, for each device from which device information was received, one or more matches between a description of the device capabilities for a device and a description of the features of one or more network software applications are determined. In this step, for each device, the description of the device capabilities is compared with the description of the features of the network software applications until one or more matches are found.

A network software application is a management application configured to monitor, control and manage devices in a managed network. For example, a network software application may be an application configured to perform content filtering for a particular user or a particular device in the managed network. A content filtering application may be invoked when a user, working at a particular device, attempts to download contents from a website that was previously blocked for the user. Another example of the network software application may include a parental-control application, which may be invoked when a child working at a particular device sends a request to a network management computer for access to a website that an authorized user (a father) previously marked as inappropriate for the child. The parental-control application may be configured to receive the request from a child's computer, forward the request to a father's computer, receive a response from the father's computer, generate control instructions according to the father's response, and send the control instructions to the child's computer.

A match between device capabilities of a particular device and features of network software applications may be determined in a variety of ways. For example, a match may be found using a text-comparison between a description of the capabilities of a device and a description of the features of each of the network applications. A description of the capabilities of a device may be provided by the device or a gateway communicating with the devices. A description of the features of the network applications may be generated by an operator of a management computer, and stored in various data structures, such as tables, spreadsheets, lists, text files or any other structure configured to store data.

Finding a match may be performed in a couple of steps. In the first step, upon receiving device information about the capabilities of a particular device, a network management computer may retrieve a data structure comprising descriptions of the capabilities and features of network applications implemented in the management computer. Using various text-comparison-techniques, the network management computer may compare the received device information of the capabilities of the particular device with the descriptions of the capabilities of the network applications. Once a match between the capabilities is found, in the second step, the network management computer may use the table again to identify the particular network application whose capabilities match the capabilities of the particular device. Based on the match, the identified particular application is most likely configured with the capabilities and features for managing the particular device.

A comparison between a description of the capabilities of a particular device and a description of the capabilities of a particular network application may be performed using various methods for comparing texts, strings and other types of data. For example, in the content filtering example described above, if a particular device has the capabilities to download contents from servers, then a description of the content filtering capabilities of the particular device may be compared with the description of the capabilities of the content-filtering application. In particular, finding a match between the description of the content downloading capabilities of the particular device and the description of the capabilities of the content filtering application may be performed by comparing the text of the description of the content downloading capabilities of the particular device with the text of the capabilities' descriptions until a match between the capabilities is found. Once a match between the capabilities is found, the network management computer may use the capabilities description again to identify the particular application that has the matching capabilities. The identified particular application is most likely configured with the content-filtering-features for managing the content downloading capabilities of the particular device.

In an embodiment, a description of the capabilities and features of a network software application is referred to as a device driver; the meaning of the term device driver for purposes of the disclosure herein is distinct and different from other uses of the term device driver in other contexts, such as the operating system context in which a device driver might be a set of instructions for controlling computer hardware peripherals or I/O devices.

In the context of this disclosure, a device driver may be implemented in a database server or any other data storage device, and may comprise data representing a description of the capabilities and features of the network software applications. For example, a device driver may be a data table that has one row for each of the network software applications supported by a network management computer, wherein a row for a particular network software application may comprise a description of the capabilities and features of the particular network software application, and, optionally, an identifier of the particular network software application. Other implementations of the device drivers may include pointers to various data structures, relational databases or other data structures.

In step 330, the process determines whether any of the one or more matches found upon receiving device information from a particular device has not yet been processed. If a particular match, for the particular device, has not yet been processed, then the process proceeds to step 340.

In step 340, based on the match, a particular network software application is selected from one or more network software applications. As described above, once a match between the capabilities of the particular devices and the capabilities of various devices is found, a particular software application, configured with the features for managing the capabilities of the particular device is identified and selected. The selection of the particular network software application may be accomplished using the particular match and a device driver (described above), a list, a spreadsheet or other data structure providing the correspondence between the capabilities of the particular software application and an identifier of the particular network software application.

In step 350, based at least in part on the device information for the particular device, a particular protocol endpoint is determined from one or more protocol endpoints. A particular protocol endpoint may be a software application configured to communicate control instructions form the particular software application to the particular device.

A protocol endpoint application may be configured to encapsulate a high level instructions and commands into low level communications units, such as packets or segments. For example, a protocol endpoint application may be an application configured to use TCP/IP packets to encapsulate HTTP instructions, sending the encapsulated instructions to a wireless device for data, and receiving data from the wireless device. A protocol endpoint may provide support for various communications protocols, including SNMP, TR68, TR98, TR140, TR126, TR143, TR106, TR111, TR135, TR104 and TR196.

In step 360, first data comprising a mapping is created and stored. In an embodiment, a mapping represents an association between a particular network software application, a particular protocol endpoint and a particular device.

A mapping represents means for controlling, managing and maintaining communications with the devices. A mapping for a particular network device reflects an association between the particular network software application configured to manage the particular devices, the particular protocol endpoint for communicating with the particular device, and the particular device. For example, if a particular computing device is a wireless device, and the particular wireless device has the capabilities to download and play video games, then a network management computer may create and store a mapping between a particular game-distribution application, a particular protocol endpoint configured to deliver games to the particular wireless device, and some type of identifier of the particular wireless device. The particular game-distribution application may be configured to receive requests and to download the games. The particular protocol endpoint may be configured to send requests from the wireless device to the particular game-distribution application, and send game contents from the particular game-distribution application (or a website or other sources) to the wireless device. The mapping may be stored in a data center, cloud data storage or any other storage facility. The mapping may be retrieved each time a user of the wireless device requests downloading a video game, and each time the network management computer downloads a video game to the wireless device.

An entry in the mapping represents a correlation between a particular network software application, a particular protocol endpoint and a particular computing device. For a particular device, a network management computer may create and store one or more entries in a mapping. For example, for a wireless device having the capabilities to receive parental-control instructions and the capabilities to receive software upgrades, the mapping may comprise at least two entries: the first entry may represent an association between a parental control network software application, a TCP/IP protocol endpoint and the particular wireless device. The first entry in the mapping may indicate that the parental control application may use the TCP/IP protocol endpoint to communicate parental control instructions to the particular wireless device. The second entry may represent an association between a software upgrade application, The TCP protocol endpoint and the particular wireless device. The second entry in the mapping may indicate that the software upgrade application may use the TCP protocol endpoint to communicate upgrades to the particular wireless device.

The same network software application may be used by more than one device and may be associated with more than one protocol endpoint. Moreover, the same protocol endpoint application may be used by more than one device and may be associated with more than one network software application. For example, if a particular device is configured to accept control instructions from more than one network software applications and using a particular protocol endpoint, then more than one entry may be created in the mapping for the particular device. If a particular device is configured to accept control instructions from a particular network software application using more than one protocol endpoint, then more than one entry may be created in the mapping for the particular device.

A network management computer may maintain a separate mapping for each individual device managed by the network management computer. Alternatively, the network management computer may maintain one mapping for each group of the devices, or one mapping for each customer premise or local network. In other implementations, the network management computer may maintain one mapping for all devices managed by the network management computer. The mapping(s) may be stored in various data structures and on various storage devices, including distributed databases, cloud systems, and other types of servers.

In step 370, an application computer program is configured to use the mapping and a user interface computer program to manage a particular device in a managed network. For example, the application computer program may be configured to cooperate with the user interface computer program to display user selectable controls in a user interface, receive user-selected controls from the user interface computer program, invoke a particular network software application to translate the user-selected controls into control instructions, and invoke a particular protocol endpoint application to send the control instructions to the particular device.

According to another example, an application computer program may be configured to cooperate with a particular network software application to generate a request for device information from a particular device, invoke a particular protocol endpoint application to send the request to the particular device, receive the requested data, invoke another software application to process the received data and store the processed data in a cloud server.

According to other example, an application computer program may receive a request, from a particular device, operated by a child, to access a particular website, which an authorized user (a parent) determined as inappropriate for the child. Upon receiving such a request, the application computer program may invoke a particular parental-control application to translate the request into parental-control instructions, and invoke a particular protocol endpoint application to send the parental-control instructions to the parent. Upon receiving a response from the parent, the application computer program may invoke the particular parental-control application to translate the response into control instructions for the particular device, and invoke the protocol endpoint application to send the control instructions to the particular device. In this example, the response from the parent may include a one-time permission to access the particular website, and the device-control instructions may cause overwriting the previously denied access to the particular website. Alternatively, the response from the parent may affirm the previously denied access to the particular website, and the device-control instructions may cause displaying the response-affirmation from the parent to the child.

The process described in steps 330-370 may be repeated for each match determined for a particular device. Once performance of steps 330-370 is completed for each match for a particular device, steps 320-370 may be repeated for another device until a mapping is created for each device from the plurality of computing devices managed by a network management computer.

In an embodiment, steps 310-370 may be repeated each time a new device is added to the network, each time a device in the network is reconfigured or updated, or each time the network configuration is changed or in any way modified.

The approach depicted in FIG. 3 addresses some of the problems described in the background section above. In particular, the approach allows managing heterogeneous third-party devices located in managed networks without actually configuring a network management application to interface with each third party device directly. Instead of communicating directly with each third-party device in a managed network, a network management application cooperates with one or more protocol endpoint applications to facilitate communications between the network management application and the devices. There is no need to configure the network management application to implement various protocols and interfaces that the customer devices implement. According to the presented approach, the communications between the network management applications and customer devices are facilitated by conduits—protocol endpoints configured to handle any protocol and interface incompatibilities.

Furthermore, the approach depicted in FIG. 3 addresses the problems related to communicating control instructions to third-party devices in a way that is transparent to users of the managed networks. Once a mapping reflecting an association between a particular network application, a particular protocol endpoint and a particular device is created and stored, the particular protocol endpoint, configured to communicate with the particular device, may be used to encapsulate control instructions intended to the particular device, and send the encapsulated control instructions to the particular device. The encapsulated instructions may be received by a gateway, which may be configured to decapsulate the control instructions and execute the instructions on the particular device. Thus, while sending the encapsulated control instructions to the particular device takes place according to the protocol that the particular device implements, execution of the decapsulated control instructions may be transparent to the users. The users of the managed networks neither need to be involved in providing device information to the network management applications nor need to be involved in executing the control instructions received from the network management applications.

Remote Management of a Device in a Managed Network

Figure 4:
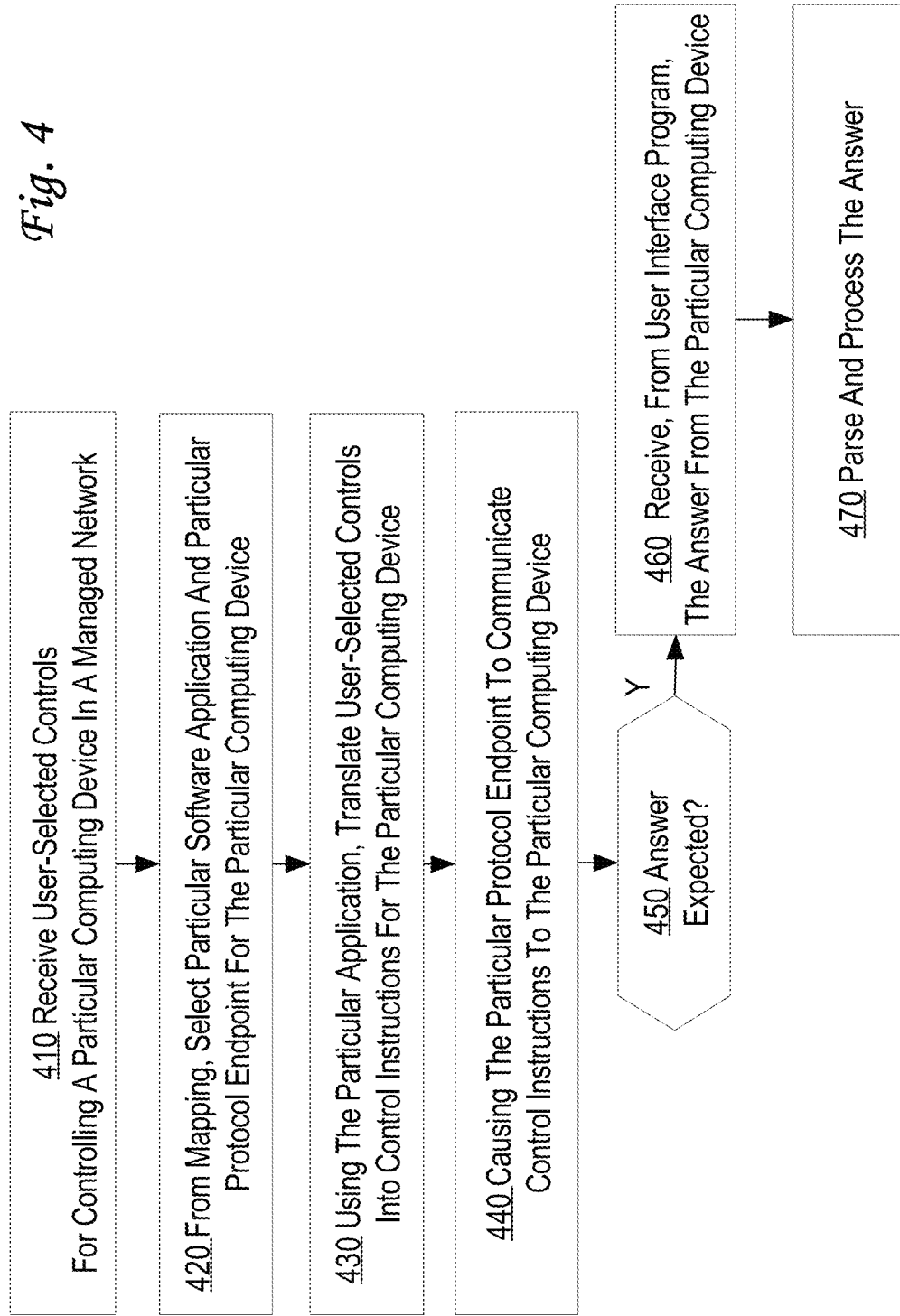
FIG. 4 illustrates an example method for remote management of a managed network.

FIG. 4 illustrates an example method for remote management of a managed network. In particular, FIG. 4 illustrates how an application computer program, executed by a network management computer, cooperates with a user interface computer program, network software applications and protocol endpoints in managing various, heterogeneous devices in the managed network.

In FIG. 4, it is assumed that a mapping between one or more network software applications, one or more protocol endpoints and one or more devices has been already created. It is also assumed that the mapping has been already stored and made available to a network management computer. Further, it is assumed that the application computer program has been already configured on the network management computer, and able to cooperate with a user interface computer program, access the mapping, receive user-selected controls, generate control instructions and receive responses from the devices.

In step 410, an application computer program receives user-selected controls, intended to control a particular computing device. The user-selected controls may be received from a user interface computer program. The user-selected controls may be received in response to displaying user selectable controls on a user interface, handled by the user interface computer program. For example, the user interface computer program may display a menu for an operator of the management computer. The menu may be presented on a graphical user interface presented on a console of a network management computer. The menu may comprise one or more options that correspond to the user selectable controls. The options may indicate a request to perform any one of: control a particular computing device, manage a wireless device, filter contents accessible from a particular computing device, provision a particular computing device, manage a network quality of service, perform a network analysis, firmware upgrade, monitor a heartbeat of a particular device, redirect network access to or from a particular device, configuration backup and restore, collect device visibility from a particular device, collect population information of a network comprising a particular computing device, or any other task. Once an operator selects a particular option from the displayed menu, the user-selected controls are communicated by the user interface computer program to the application computer program, executed by the network management computer.

In step 420, data representing an association mapping between network software applications, protocol endpoints and devices is retrieved, and, based at least in part on the data comprising the mapping, a particular network software application and a particular protocol endpoint for a particular device in a managed network are selected. In some embodiments, the selection of the particular network software application and the particular protocol endpoint is also based on the received user-selected controls. For example, if a request, received from a particular device, indicates a request for a software upgrade for the particular device, then an application program may retrieve the mapping for the particular device, determine the particular software application configured to process the software upgrade requests, and determine the particular protocol endpoint configured to communicate software upgrade instructions to the particular device.

In an embodiment, a particular network software application is configured to translate user-selected controls into control instructions to be executed on a particular device. For example, if the user-selected controls pertain to a parental-control of the contents downloaded to a particular device, then the particular parental-control application may be configured to translate the user-selected controls into parental-control parameters and settings, store the parameters and settings for the particular device in a database, and control downloading contents to the particular device according to the stored parameters and settings.

In an embodiment, a particular protocol endpoint is an application configured to communicate control instructions to a particular device, and receiving data from the particular device. A particular protocol endpoint application identified for a particular device is a protocol endpoint application that is configured to communicate control instructions to the particular device using the communications protocol that the particular device understands. For example, a particular protocol endpoint may be configured to encapsulate high level control instructions into packets or segments specific to a particular communications protocol, such as SNMP, TCP, TCP/IP or other protocols. The particular protocol endpoint may use the particular communications protocol to communicate the encapsulated control instructions in the packets or segments to the particular device. The particular protocol endpoint may also receive responses encapsulated in the messages, packets or segments from the particular devices, decapsulate the responses, and transmit the responses to a particular network software application.

In step 430, using the particular network software application, the user-selected controls are translated to control instructions for a particular device. For example, if the user-selected controls pertain to upgrading a particular wireless device, then the particular wireless-upgrade application may translate the wireless-upgrade request into controls instructions. The control instructions may specify a type of upgrade, an upgrade version, an upgrade content and other upgrade-related information.

In step 440, the process causes the particular protocol endpoint to communicate the control instructions to the particular computing device. For example, if the particular computing device implements TCP/IP, then a TCP/IP protocol endpoint application is invoked and executed to encapsulate the control instructions into TCP/IP packets, and to communicate the encapsulated control instructions to the particular device.

In step 450, it is checked whether an answer is expected from the particular device. A response may be expected if the control instructions comprised a request for any of device information, device status information, device current configuration, device capabilities, and other types of information. A response may be also expected for example, if the control instructions comprised a request for the particular device to confirm a successful (or unsuccessful) execution of the received control instructions.

If in step 450 it is determined that an answer is expected from the particular device, then in step 460, the process waits for the particular device to provide the answer. The process may wait for a specified period of time, which may vary in various embodiments.

Once the answer is received, in step 470, the process invokes a particular network software application to translate and interpret the answer. For example, if the answer comprises configuration information of the particular device, then in step 470, the answer is parsed, the configuration information is extracted from the answer and the extracted configuration information is processed and stored in data storage, such as a cloud server.

The presented approach addresses some of the problems identified in the background section above. For example, according to the presented approach, user-selected controls intended to monitor and manage a particular device may be translated to control instructions by a particular software application, which does not need to be configured to communicate with the particular device directly. The particular software application may translate the user-selected controls to the control instructions for the particular device without actually communicating with the particular device directly.

Further, enhancing or extending network management features of a network management application may be accomplished by developing a network management extension, which does not need to be configured to directly communicate with the customer devices. The communications aspects of the network management may be handled by different applications, such as protocol endpoint applications.

In an embodiment, the presented approach allows communicating control instructions transparently to users in managed networks. A protocol endpoint, selected from a mapping for a particular device, may encapsulate the control instructions, and communicate the encapsulated control instructions to the particular device. The decapsulated instructions may be executed transparently to a user of the particular device and without the user's involvement. The managing of the networks comprising any quantity and variety of heterogenic devices may be performed transparently to the users in the managed network.

The techniques herein are applicable to other architectures or in other settings. For example, instead of managing residential local area networks, the techniques may be instead or also used to manage networks in corporate settings or data centers. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
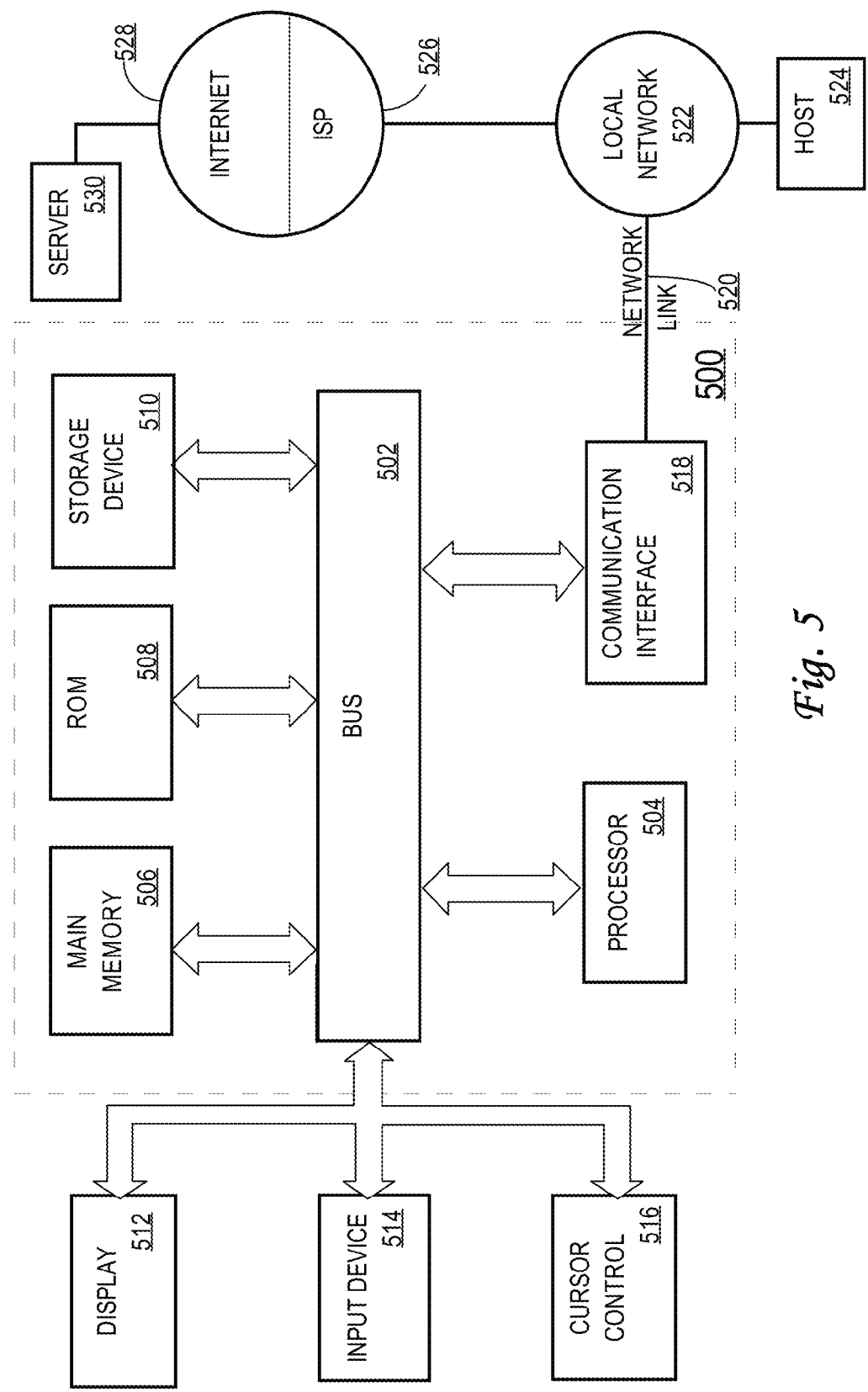
FIG. 5 illustrates an example computer system with which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable storage medium storing one or more instructions which, when executed by one or more processors, cause the one or more processors to perform:
    collecting, at a network management computer that is located separately with respect to a networked plurality of computing devices, device information about each of the computing devices, wherein the device information comprises device capabilities;
    for each particular computing device:
        determining one or more matches between the device capabilities for the particular computing device, and features of one or more network software applications;
        for a particular match:
            based at least in part on the particular match, determining a particular network software application that is configured to control the particular computing device;
            based at least in part on the device information for the particular computing device, determining a particular protocol endpoint from one or more protocol endpoints that is configured to communicate control instructions from the particular network software application to the particular computing device;
            creating and storing first data comprising a mapping between the particular network software application, the particular protocol endpoint and the particular computing device;
            configuring an application computer program to use both the mapping and a user interface computer program to manage the particular computing device, wherein the configuring comprises configuring the user interface computer program with user selectable controls which, when selected, cause generating the control instructions.

2. The non-transitory computer readable storage medium of claim 1, further storing instructions which, when executed, cause the one or more processors to perform:
    receiving, from the user interface program, second data defining particular user-selected controls for the particular computing device;
    using the particular network software application, translating the user-selected controls into particular control instructions for the particular computing device;
    causing the particular protocol endpoint to communicate the particular control instructions to the particular computing device;
    wherein the particular control instructions cause any one of: controlling the particular computing device, managing a wireless network, content filtering, provisioning the particular computing device, managing a network quality of service, performing a network analysis, firmware upgrading, heartbeat monitoring, network access redirecting, configuration backup and restore, collecting device visibility, collecting population information of a network comprising the particular computing device.

3. The non-transitory computer readable storage medium of claim 1, further storing instructions which, when executed, cause the one or more processors to perform:
    establishing a communications session with the particular computing device;
    receiving device identity information from the particular computing device;
    retrieving the particular network software application that is configured to control the particular computing device;
    retrieving the particular protocol endpoint that is configured to communicate the control instructions to the particular computing device;
    retrieving the application computer program that is configured to manage the particular computing device;
    creating and storing a data structure for storing application state and data as the application computer program manages the particular computing device.

4. The non-transitory computer readable storage medium of claim 1, wherein the one or more protocol endpoints provide support for any one of: SNMP, TR68, TR98, TR140, TR126, TR143, TR106, TR111, TR135, TR104, TR196.

5. The non-transitory computer readable storage medium of claim 1, wherein the network management computer is configured to manage a plurality of different local area networks, each located on a different customer premise and comprising heterogeneous computing devices.

6. The non-transitory computer readable storage medium of claim 1, wherein the network management computer is a customer representative computer that is configured to automatically configure one or more different local area networks.

7. The non-transitory computer readable storage medium of claim 1, further storing instructions which, when executed, cause the one or more processors to perform:
    configuring a workflow computer program to manage synchronous or asynchronous state transitions between multiple components of the network management computer, and waiting for a particular computing device to respond to an HTTP request.

8. A non-transitory computer readable storage medium storing one or more instructions which, when executed by one or more processors, cause the one or more processors to perform:
   receiving, at a network management computer that is located separately with respect to a networked plurality of computing devices, device information about a particular computing device, wherein the device information comprises device capabilities;
   determining a match between the device capabilities and features of one or more network software applications;
   based at least in part on the match, determining a particular network software application that is configured to control the particular computing device;
   based at least in part on the device information, determining a particular protocol endpoint from one or more protocol endpoints that is configured to communicate control instructions from the particular network software application to the particular computing device;
   creating and storing first data comprising a mapping between the particular network software application, the particular protocol endpoint and the particular computing device;
   configuring an application computer program to use both the mapping and a user interface computer program to manage the particular computing device;
   configuring the user interface computer program with user selectable controls which, when selected, cause generating the control instructions;
   receiving, from the user interface program, second data defining particular user-selected controls for the particular computing device;
   using the particular network software application, translating the user-selected controls into particular control instructions for the particular computing device;
   causing the particular protocol endpoint to communicate the particular control instructions to the particular computing device.

9. The non-transitory computer readable storage medium of claim 8, further storing instructions which, when executed, cause the one or more processors to perform:
   wherein the particular control instructions cause any one of: controlling the particular computing device, managing a wireless network, content filtering, provisioning the particular computing device, managing a network quality of service, performing a network analysis, firmware upgrading, heartbeat monitoring, network access redirecting, configuration backup and restore, collecting device visibility, collecting population information of a network comprising the particular computing device.

10. The non-transitory computer readable storage medium of claim 8, further storing instructions which, when executed, cause the one or more processors to perform:
    receiving a response from the particular computing device;
    using the mapping, retrieving the particular network software application that is configured to control the particular computing device;
    using the particular network software application, interpreting the response from the particular computing device and determining additional user selectable controls;
    causing the user interface program to display the additional user selectable controls.

11. A method comprising:
    collecting, at a network management computer that is located separately with respect to a networked plurality of computing devices, device information about each of the computing devices, wherein the device information comprises device capabilities;
    for each particular computing device:
       determining one or more matches between the device capabilities for the particular computing device, and features of one or more network software applications;
       for a particular match:
          based at least in part on the particular match, determining a particular network software application that is configured to control the particular computing device;
          based at least in part on the device information for the particular computing device, determining a particular protocol endpoint from one or more protocol endpoints that is configured to communicate control instructions from the particular network software application to the particular computing device;
          creating and storing first data comprising a mapping between the particular network software application, the particular protocol endpoint and the particular computing device;
          configuring an application computer program to use both the mapping and a user interface computer program to manage the particular computing device, wherein the configuring comprises configuring the user interface computer program with user selectable controls which, when selected, cause generating the control instructions;
    wherein the method is performed by one or more computing devices.

12. The method of claim 11, further comprising:
    receiving, from the user interface program, second data defining particular user-selected controls for the particular computing device;
    using the particular network software application, translating the user-selected controls into particular control instructions for the particular computing device;
    causing the particular protocol endpoint to communicate the particular control instructions to the particular computing device;
    wherein the particular control instructions cause any one of: controlling the particular computing device, managing a wireless network, content filtering, provisioning the particular computing device, managing a network quality of service, performing a network analysis, firmware upgrading, heartbeat monitoring, network access redirecting, configuration backup and restore, collecting device visibility, collecting population information of a network comprising the particular computing device.

13. The method of claim 11, further comprising:
    establishing a communications session with the particular computing device;
    receiving device identity information from the particular computing device;
    retrieving the particular network software application that is configured to control the particular computing device;
    retrieving the particular protocol endpoint that is configured to communicate the control instructions to the particular computing device;
    retrieving the application computer program that is configured to manage the particular computing device;

creating and storing a data structure for storing application state and data as the application computer program manages the particular computing device.

14. The method of claim 11, wherein the one or more protocol endpoints provide support for any one of: SNMP, TR68, TR98, TR140, TR126, TR143, TR106, TR111, TR135, TR104, TR196.

15. The method of claim 11, wherein the network management computer is configured to manage a plurality of different local area networks, each located on a different customer premise and comprising heterogeneous computing devices.

16. The method of claim 11, wherein the network management computer is a customer representative computer that is configured to automatically configure one or more different local area networks.

17. The method of claim 11, further comprising: configuring a workflow computer program to manage synchronous or asynchronous state transitions between multiple components of the network management computer, and waiting for a particular computing device to respond to an HTTP request.

18. A method comprising:
receiving, at a network management computer that is located separately with respect to a networked plurality of computing devices, device information about a particular computing device, wherein the device information comprises device capabilities;
determining a match between the device capabilities and features of one or more network software applications;
based at least in part on the match, determining a particular network software application that is configured to control the particular computing device;
based at least in part on the device information, determining a particular protocol endpoint from one or more protocol endpoints that is configured to communicate control instructions from the particular network software application to the particular computing device;
creating and storing first data comprising a mapping between the particular network software application, the particular protocol endpoint and the particular computing device;
configuring an application computer program to use both the mapping and a user interface computer program to manage the particular computing device;
configuring the user interface computer program with user selectable controls which, when selected, cause generating the control instructions;
receiving, from the user interface program, second data defining particular user-selected controls for the particular computing device;
using the particular network software application, translating the user-selected controls into particular control instructions for the particular computing device;
causing the particular protocol endpoint to communicate the particular control instructions to the particular computing device;
wherein the method is performed by one or more computing devices.

19. The method of claim 18,
wherein the particular control instructions cause any one of: controlling the particular computing device, managing a wireless network, content filtering, provisioning the particular computing device, managing a network quality of service, performing a network analysis, firmware upgrading, heartbeat monitoring, network access redirecting, configuration backup and restore, collecting device visibility, collecting population information of a network comprising the particular computing device.

20. The method of claim 18, further comprising:
receiving a response from the particular computing device;
using the mapping, retrieving the particular network software application that is configured to control the particular computing device;
using the particular network software application, interpreting the response from the particular computing device and determining additional user selectable controls;
causing the user interface program to display the additional user selectable controls.

* * * * *